United States Patent [19]

Sansing

[11] Patent Number: 5,028,010
[45] Date of Patent: Jul. 2, 1991

[54] APPARATUS FOR MIXING SOLID OR SEMI-SOLID WASTES WITH ADDITIVES

[75] Inventor: Donald R. Sansing, Commerce, Tex.
[73] Assignee: Itex Enterprises, Inc., Dallas, Tex.
[21] Appl. No.: 452,223
[22] Filed: Dec. 18, 1989
[51] Int. Cl.⁵ .......................................... B02C 19/00
[52] U.S. Cl. ............................ 241/101 B; 241/101.6
[58] Field of Search .................. 241/101 B, 101.6, 21

[56] References Cited

U.S. PATENT DOCUMENTS

| | | | |
|---|---|---|---|
| 1,036,327 | 8/1912 | Pickett | 241/101.6 X |
| 2,492,421 | 12/1949 | Golben . | |
| 2,874,907 | 2/1959 | Renaud et al. | 241/101.6 X |
| 2,886,287 | 5/1959 | Croley . | |
| 3,925,150 | 12/1975 | Marsh . | |
| 4,105,553 | 8/1978 | Oldham . | |
| 4,175,039 | 11/1979 | Fisher . | |
| 4,353,803 | 10/1982 | Dover . | |
| 4,362,628 | 12/1982 | Kennedy . | |
| 4,366,063 | 12/1982 | O'Connor . | |
| 4,393,338 | 7/1983 | Rowton . | |
| 4,509,696 | 4/1985 | Donaldson . | |
| 4,536,286 | 8/1985 | Nugent . | |
| 4,547,290 | 10/1985 | Pichat . | |
| 4,770,708 | 9/1988 | Atkins et al. . | |
| 4,815,668 | 3/1989 | Frei . | |
| 4,881,690 | 11/1989 | Maier . | |
| 4,884,756 | 12/1989 | Pearson . | |

FOREIGN PATENT DOCUMENTS 1084970  2/1960  Fed. Rep. of Germany .

*Primary Examiner*—Mark Rosenbaum
*Assistant Examiner*—Frances Chin
*Attorney, Agent, or Firm*—Arnold, White & Durkee

[57] ABSTRACT

An apparatus and method for mixing solid or semi-solid waste materials with one or more additives to produce a solid nonpolluting end product is disclosed. A receiving hopper equipped with paddle-type chopping auger conveyors receives the solid or semi-solid waste material, reduces the size of lumps contained in the waste material and discharges the material into a batch hopper. The batch hopper is equipped with a weighing mechanism to determine the amount of waste material loaded into the batch hopper and thereby enable the calculation of the appropriate amount of additive(s). The mixture of waste materials and additive(s) is then transferred to a pin blender for homogenization. The homogenized mixture may then be hauled or pumped to a final disposal site.

13 Claims, 12 Drawing Sheets

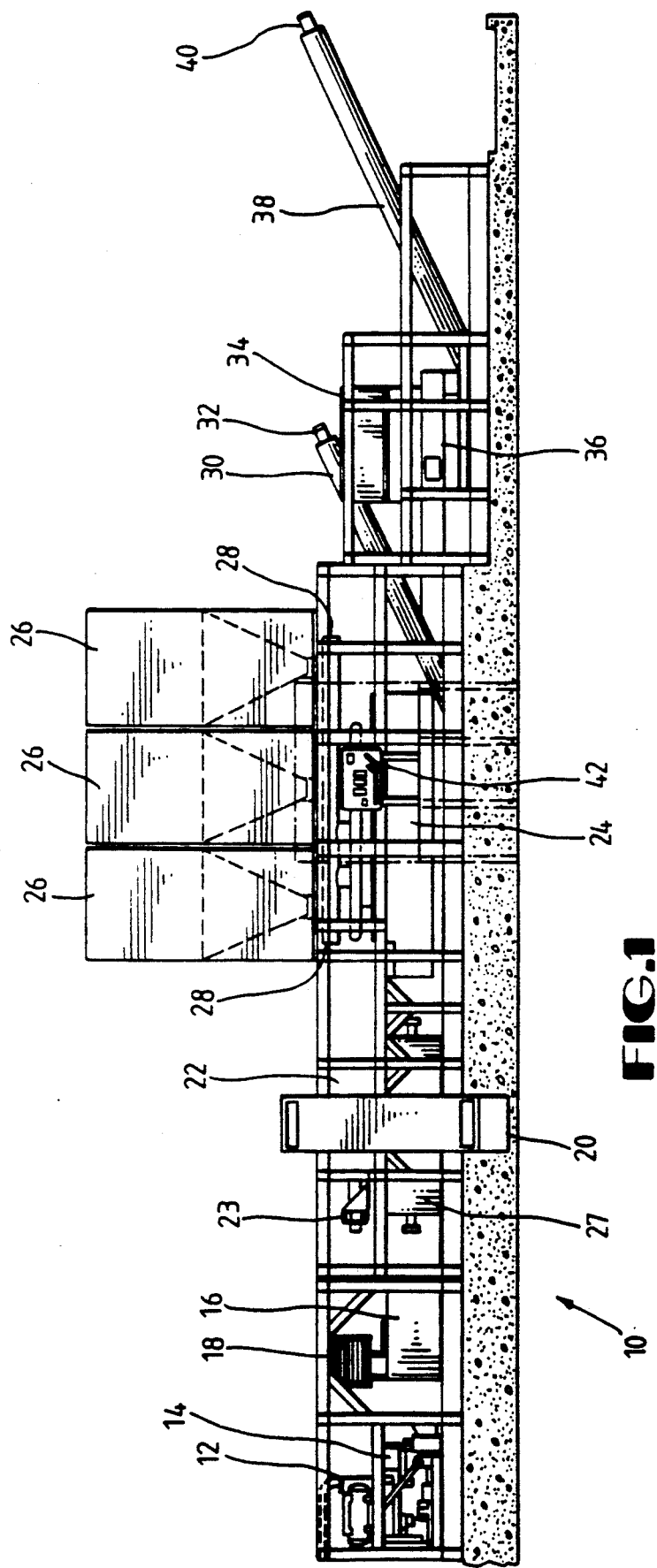

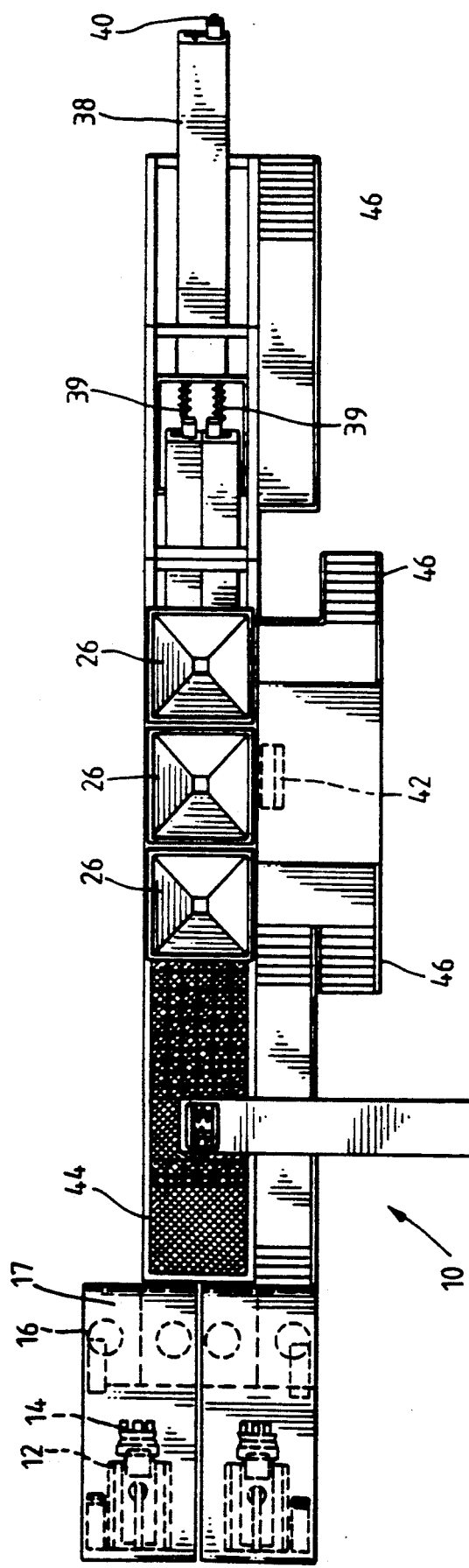
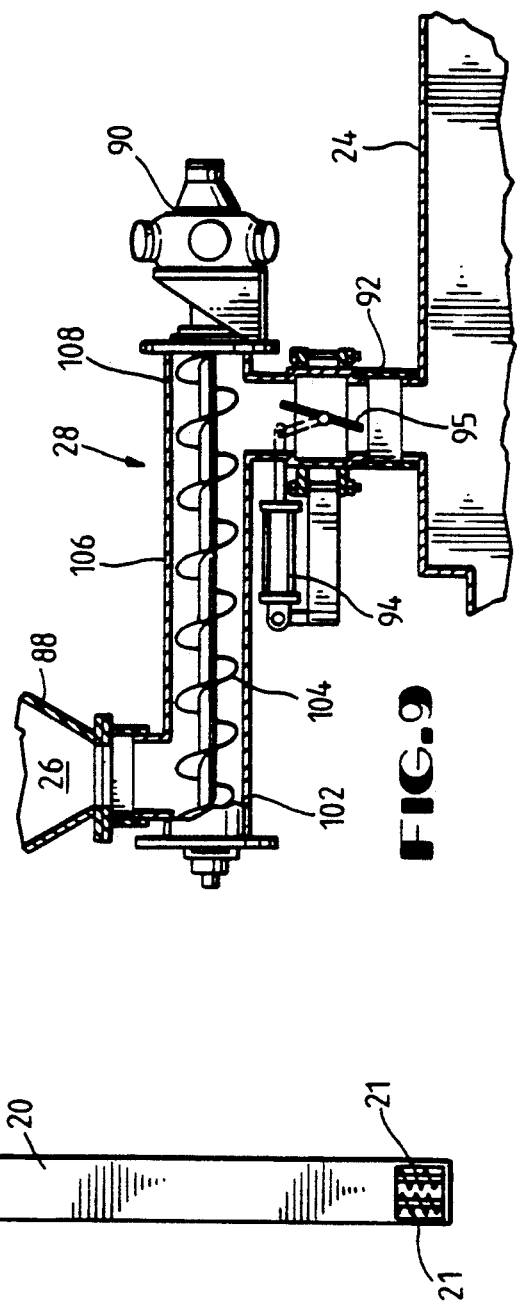

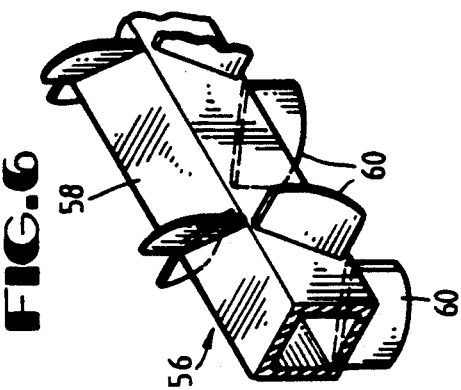
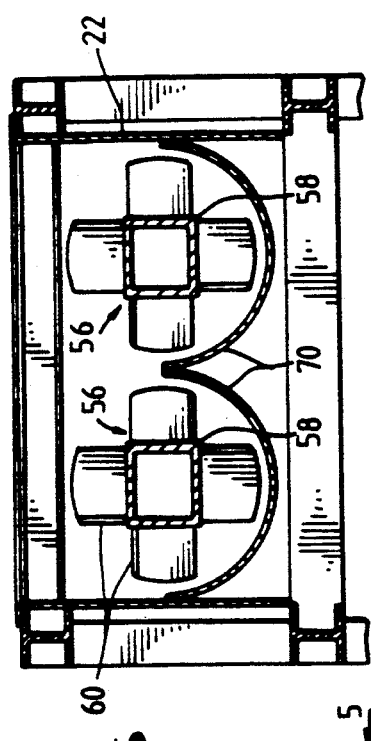
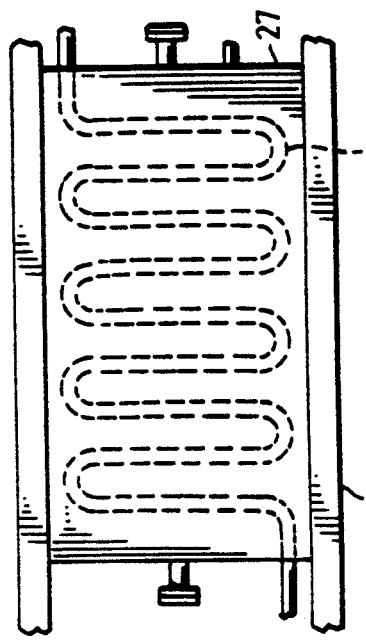
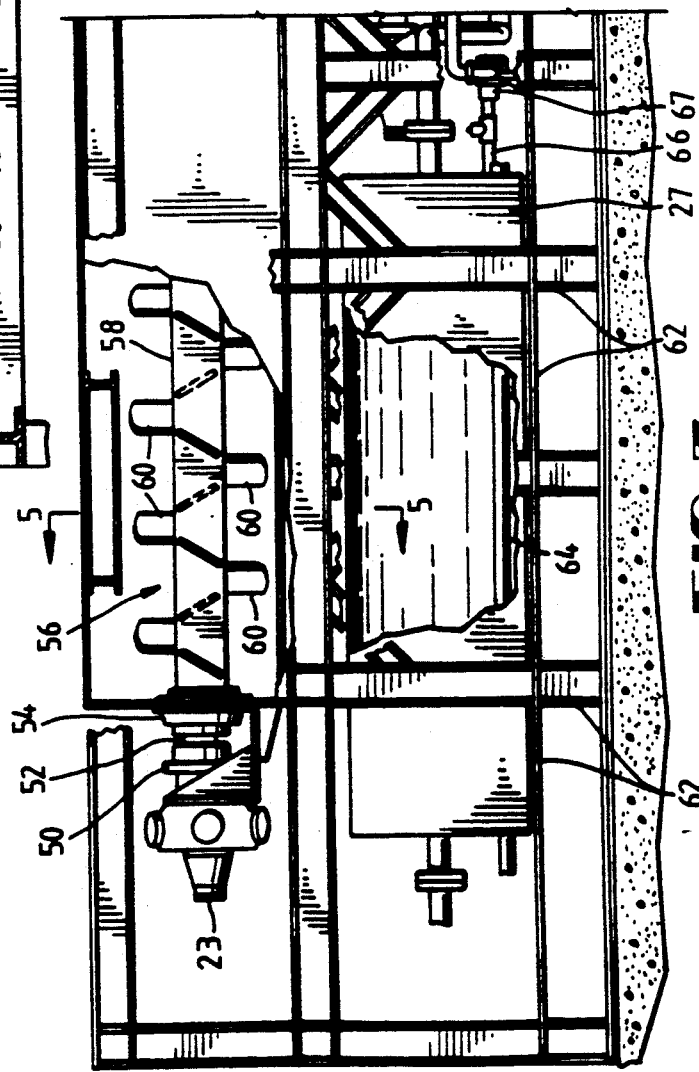

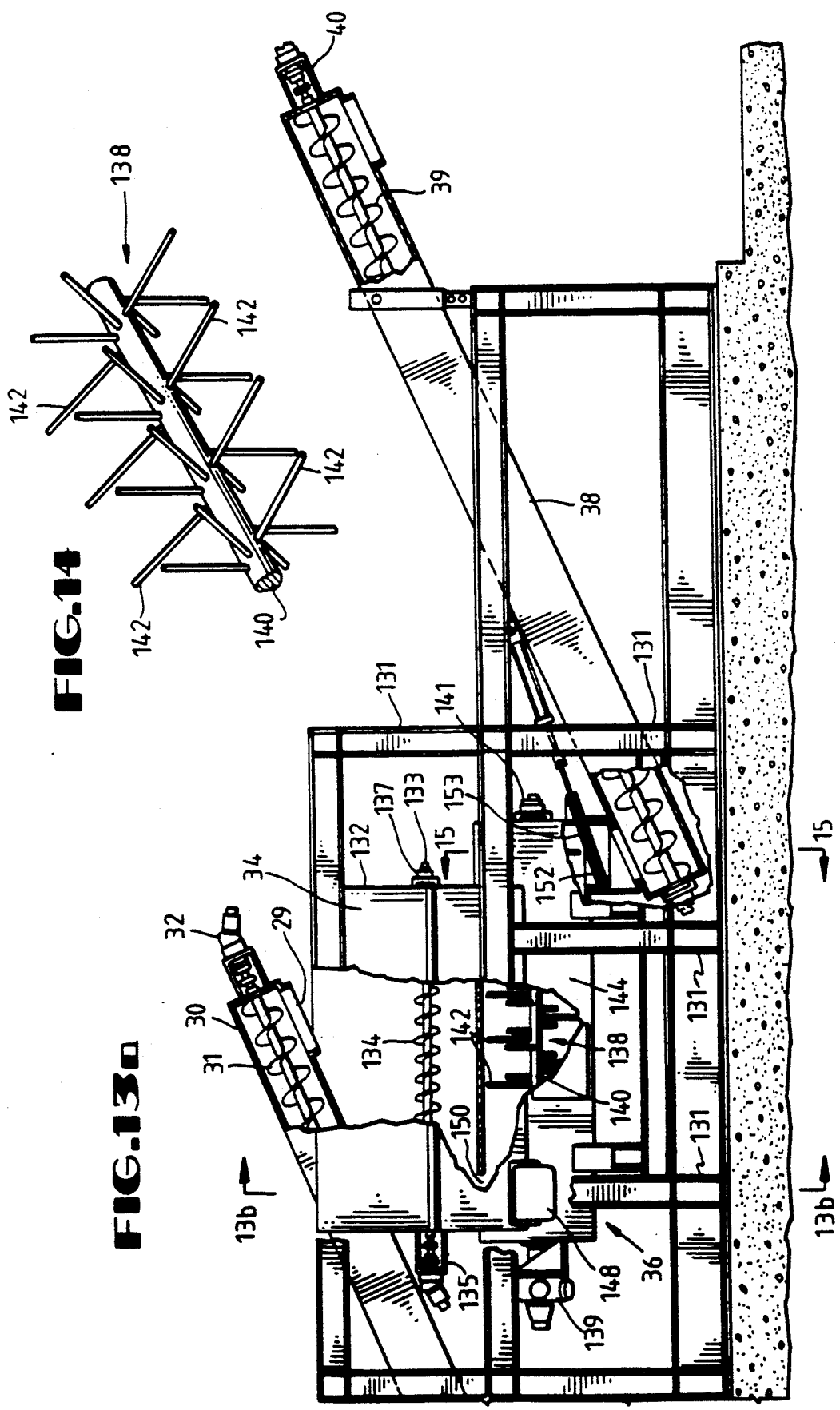

APPARATUS FOR MIXING SOLID OR SEMI-SOLID WASTES WITH ADDITIVES

TECHNICAL FIELD

This invention relates to the blending of additives with solid or semi-solid waste materials in order to produce a solidified end product.

BACKGROUND OF THE INVENTION

Industries generate large quantities of liquid, semi-solid and solid waste materials on a daily basis. As a result of this industrial activity, large masses of such materials exist which present a considerable hazard to the environment. These waste materials are often in the form of solids or highly viscous semi-solids containing hard lumps of solid material. Of particular concern are waste materials containing heavy metals which may be leached into surface water and ground water.

A number of methods for treating waste material with additives to form a physically and chemically stable end product have been proposed. Examples of such processes are disclosed in the following U.S. Pat. Nos.: 4,741,776 issued May 3, 1988 to Bye, et al.; 4,600,514 issued July 15, 1986 to Conner; 4,547,290 issued Oct. 15, 1985 to Pichat; 4,533,395 issued Aug. 6, 1985 to Vejmelka, et al.; 4,518,508 issued May 21, 1985 to Conner; 4,509,696 issued Apr. 9, 1985 to Donaldson; 4,432,666 issued Feb. 21, 1984 to Frey, et al.; 4,338,134 issued July 6, 1982 to Graf zu Munster; 4,209,335 issued June 24, 1980 to Katayama, et al.; 4,274,880 issued June 23, 1981 to Chappell; 4,149,968 issued Apr. 17, 1979 to Kupiec, et al.; 3,947,284 issued Mar. 30, 1976 to Kitsugi, et al.; 3,841,102 issued Oct. 15, 1974 to Sinner, et al.; and, 3,837,872 issued Sept. 24, 1974 to Conner. For example, U.S. Pat. No. 4,509,696 to Donaldson discloses an apparatus and method for treating disposable organic waste material with an alkaline metal silicate and a setting agent. The apparatus and method disclosed in the U.S. Pat. No. 4,509,696 is not, however, adapted to treat solid waste or highly viscous semi-solid waste containing hard solid lumps of waste material. Consequently, there exists a need for an apparatus and method for mixing solid or highly viscous semi-solid waste materials with additives in order to effect the treatment of the waste materials.

SUMMARY OF THE INVENTION

The apparatus and method of the present invention provide a means whereby solid or highly viscous semi-solid materials containing hard lumps of solid wastes can be economically and effectively mixed with additives in order to produce a chemically and physically stable end product. The apparatus and method of the present invention can be used in conjunction with appropriate additives to produce a homogeneous end product in which hazardous components of waste materials are contained. The end product is made homogeneous through a multiple stage chopping and mixing procedure.

Solid or semi-solid waste material to be treated by the apparatus and method of the present invention is placed in a receiving hopper equipped with hydraulically driven paddle-type chopping augers. The augers reduce the size of any lumps contained in the material as the material is conveyed by the augers to the discharge end of the receiving hopper. The waste material is discharged from the receiving hopper into a batch hopper. The batch hopper is equipped with two pair of paddle-type mixing augers. Each pair of mixing augers is independently reversible. Thus, the pairs of mixing augers may be driven in opposite directions.

The batch hopper is suspended from a weighing mechanism that is used in conjunction with a load cell to weigh the batch hopper and the contents thereof. The batch hopper is weighed before and after it is loaded with waste material. The weight of the waste material contained in the hopper is used to determine the appropriate amount(s) of additive(s) to be added to the waste material.

Screw-type auger conveyers feed predetermined amounts of additives to the batch hopper from additive hoppers located adjacent to the batching hopper. The additives are thoroughly mixed with the waste material in the batch hopper by the operation of the paddle-type mixing augers. If desired, one pair of the paddle-type mixing augers may be operated in a reverse direction thereby setting up a swirling action within the batch hopper. The waste material/additive mixture is thus circulated within the batch hopper until the desired degree of mixing is achieved. A water source is connected to the batch hopper and a control valve is activated to selectively add water to the waste material/additive mix as necessary to achieve the desired consistency. Once the desired consistency and degree of mixing have been achieved, the waste material/additive mixture is discharged through hydraulically operated slide gates located at the discharge end of the batch hopper.

After the waste material and additives have been mixed to the desired consistency in the batch hopper, the mixture is discharged through hydraulically operated slide gates into screw-type auger conveyors that feed the mixture into a high-speed pin blender. The mixture is subjected to high-speed blending in the pin blender to insure that the end product is homogenous. The blending operation, by insuring the homogenity of the end product, allows the use of the minimum amount of additive(s) necessary to effectively treat the waste material. After the mixture has been blended, it is discharged from the pin blender into a screw-type auger conveyor for truck loading. Alternatively, the mixture may be discharged from the pin blender to a slurry or concrete pump and pumped to a final or intermediate disposal location.

The apparatus and method of the present invention provide a means for blending solid or highly viscuous semi-solid waste material with additives to form a homogenous slurry-like mixture that is readily disposable. Large volumes of waste materials may be converted into a disposable material economically and in a short period of time through the use of the present invention. Moreover, the present apparatus and method is readily adapted to computer control once the required mixing time and required amounts of appropriate additive(s) have been determined.

BRIEF DESCRIPTION OF THE DRAWINGS

FIG. 1 is a perspective view of the apparatus of the present invention;

FIG. 2 is a top view of the apparatus of the present invention;

FIG. 3 is a partial cutaway view of the receiving hopper of the apparatus;

FIG. 4 is a schematic illustration of the arrangement of the hydraulic fluid cooling coil of the apparatus;

FIG. 5 is a cross-sectional view along line 5-5 of FIG. 3;

FIG. 6 is a perspective view of part of a chopping auger of the apparatus;

FIG. 7b is a cross-sectional view along line 7b-7b of FIG. 7a,

FIG. 9 is a cross-sectional view of the screw-type additive feed augers of the apparatus;

FIG. 13a is a partial cutaway view of the pin mixer of the apparatus;

FIG. 13b is a cross-sectional view along line 13b-13b of FIG. 13a;

FIG. 14 is a perspective view further illustrating the pin mixer impeller;

FIG. 15 is a cross-sectional view along line 15—15 of FIG. 13a;

DETAILED DESCRIPTION OF THE DRAWINGS

Figure 7A:
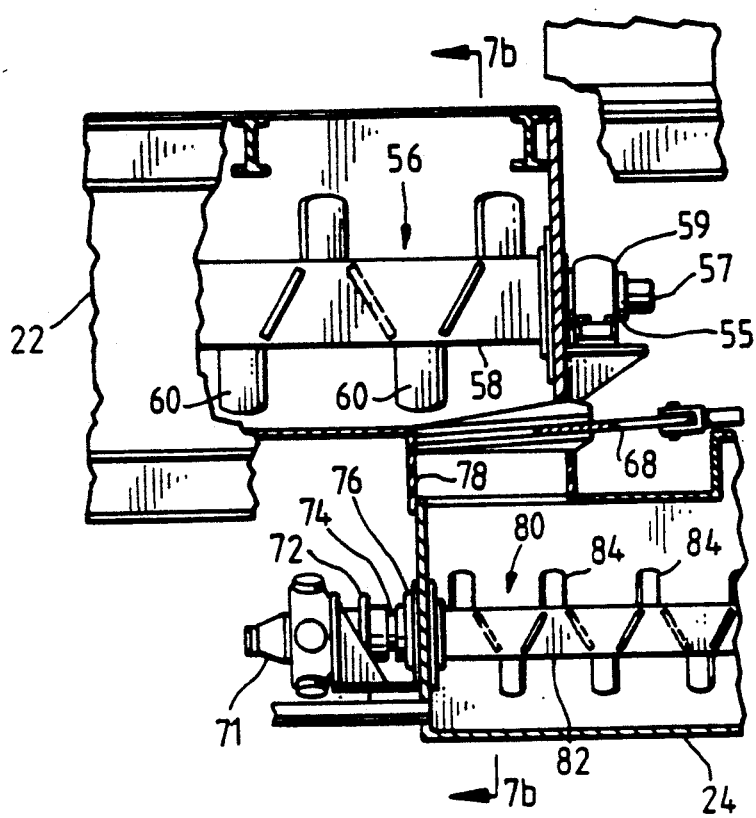
FIG. 7a is a partial cutaway view of the receiving hopper and the batch hopper of the present invention.

Referring now to the drawings, and particularly to FIG. 1 thereof, the mixing and blending apparatus of the present invention is illustrated. A pair of diesel engines 12 drive hydraulic pumps 14 to furnish power for the various units of the apparatus. A pair of dual compartment tanks 16, one corresponding to each of the engines 12 is also provided. One compartment of each dual compartment tank 16 serves as a fuel tank for the corresponding diesel engine 12, while the other compartment serves as a hydraulic reservoir for the corresponding hydraulic pumps 14. A radiator 18 is provided to cool the hydraulic fluid as it is recirculated back to the hydraulic pumps 14.

Solid or semi-solid waste material is received by feed conveyor 20 for transport to receiving hopper 22. Feed conveyor 20 may be equipped with a suitable hopper (not shown) for receiving waste material from trucks, dump trucks, front-end loaders or in any other suitable manner. It is anticipated that some types of semi-solid waste material may be pumped directly to receiving hopper 22, thereby alleviating the need for feed conveyor 20. Receiving hopper 22 is equipped with a pair of paddle-type chopping augers which are driven under the action of hydraulic motors 23. The paddle-type chopping augers serve to the reduce the size of lumps or solid material contained in the waste material being processed. Waste material is discharged from receiving hopper 22 through a pair of hydraulically operated slide gates into a batch hopper 24. Batch hopper 24 is equipped with two pair of mixing augers that mix the waste material with additives stored in additive hoppers 26. Selected additives are fed from additive hoppers 26 into the batch hopper 24 with screw-type augers 28. A water tank 27 is used to store water which is selectively added to batch hopper 24 to adjust the consistency of the mixture of waste materials and additives.

Once the desired consistency and degree of mixing have been achieved, the waste material is discharged from the batch hopper 24 through a pair of hydraulically operated slide gates into a double screw-type auger transfer conveyor 30. The screw-type augers of transfer conveyor 30 are driven by hydraulic motors 32. The transfer conveyor 30 discharges a mixture of waste material and additives into pin blender hopper 34. Pin blender hopper 34 is equipped with screw-type auger conveyors that discharge the mixture into a pin blender 36. Pin blender 36 homogenizes the mixture of waste materials and additives and discharges the mixture into load out conveyor 38. Load out conveyor 38 is also a double screw-type auger conveyor The auger screws 39 of load out conveyor 38 are drive by hydraulic motors 40.

It is anticipated that in some cases it may be advantageous to substitute a slurry or concrete pump for load out conveyor 38. Thus a mixture discharged from pin blender 36 may be pumped to an intermediate or final disposal location. It is also anticipated that in some cases, the desired degree of mixing and homogenity may be achieved without the use of pin blender 36. In such cases, the waste material additive mixture may be loaded out or pumped directly from batch hopper 24.

A control panel 42 is mounted on the side of the apparatus 10. The control panel 42 provides for operator control of the various power units of the apparatus 10. A control booth (not shown) may be optionally mounted on apparatus 10 for the convenience and comfort of the operator.

FIG. 2 further illustrates the arrangement of the diesel engines 12 and the hydraulic pumps 14. The dashed lines 17 represent the partitions of double compartment tanks 16. The auger screws 21 of the feed conveyor 20 deposit solid or semi-solid waste material upon grill 44. Grill 44 covers the top of the receiving hopper 22 and prevents objects such as pieces of metal, stones or concrete from entering the receiving hopper and damaging the paddle-type chopping augers. Stairs 46 are provided to allow the operator access to the various levels an components of the apparatus 10. FIG. 2 also illustrates in greater detail the auger screws 39 of load out conveyor 38.

FIG. 3 illustrates the receiving hopper 22 of the present invention in greater detail. Hydraulic motor 23 is mounted on structural member 62 to drive chopping auger 56 through coupling 50 and shaft 52 which is supported by bearing 54. Each of the chopping augers 56 includes chopping paddles 60 that are mounted on a substantially rectangular shaft 58. The paddles 60 are angled so as to push waste material deposited in receiving hopper 22 toward the discharge end of the receiving hopper while simultaneously chopping and reducing the size of solid lumps contained in the waste material.

FIG. 3 also illustrates water tank 27 in greater detail. Water tank 27 is mounted on structural members 62 and includes cooling coil 64 that cools the hydraulic fluid used to power the various components of the apparatus of the present invention. The hydraulic fluid used in the present invention accumulates significant amounts of heat energy as it is pumped and used to power the apparatus. In order to prevent the hydraulic fluid from foaming due to the accumulated heat energy, it is necessary to cool the fluid. Therefore, the hydraulic fluid is passed through cooling coil 64 as it is circulated. Water tank 27 also includes a discharge line 66, a pump 67 and a control valve (not shown) for providing water to the batch hopper 24.

FIG. 4 further illustrates the arrangement of the cooling coil 64 in the water tank 27. The pipe that comprises cooling coil 64 is transversely looped as it passes through water tank 27. This maximizes the heat exchange from the hydraulic fluid to the water contained in tank 27.

FIG. 5 further illustrates the arrangement of the chopping augers 56 in receiving hopper 22. The chopping augers 56 are positioned within semicircular troughs 70. The troughs 70 facilitate the chopping action of the paddles 60 as waste material is conveyed to the discharge end of the receiving hopper.

FIG. 6 illustrates the construction of the chopping augers 56. The shaft 58 of the chopping auger 56 comprises a substantially rectangular channel. The paddles 60 are welded or otherwise mounted on the substantially flat sides of the shaft 58 at an appropriate angle to facilitate movement of the waste material through the receiving hopper 22 while simultaneously chopping and reducing the size of solid lumps of material passing through the receiving hopper 22.

Figure 7B:
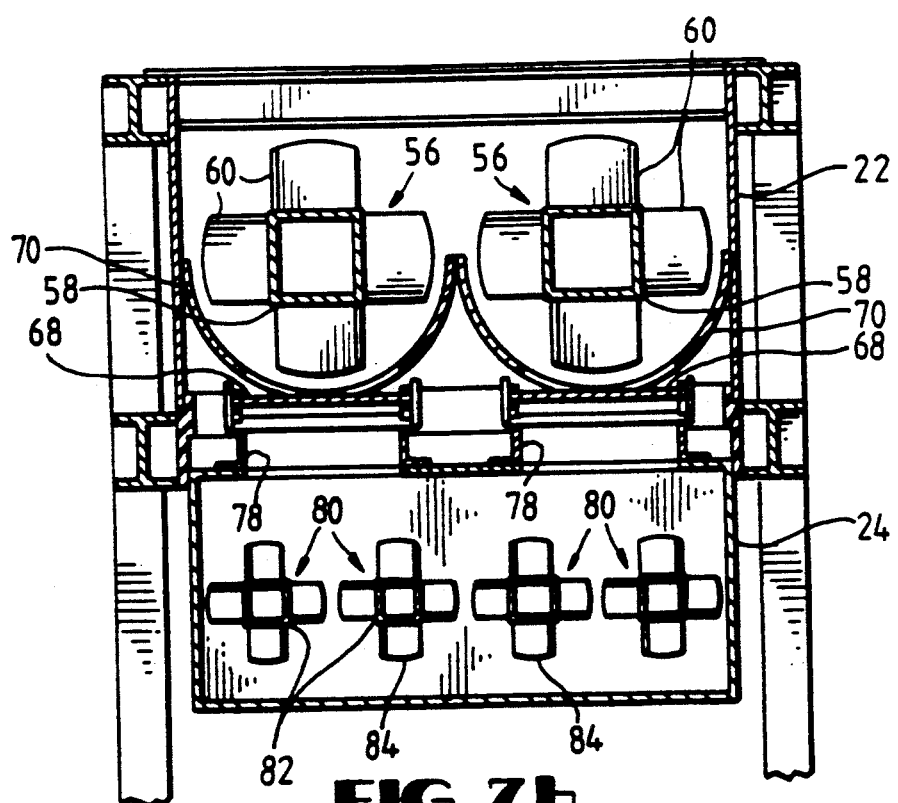

FIGS. 7a and 7b show the relationship between receiving hopper 22 and batch hopper 24. When it is desired to transfer waste material from receiving hopper 22 to batch hopper 24, hydraulically operated slide gates 68 are retracted. Waste material may then be discharged by chopping auger 56 through flexible boots 78 into batch hopper 24. Chopping auger 56 terminates in shaft 57 that is supported by bearing 55 mounted in pillow block 59.

Batch hopper 24 is equipped with two pairs of mixing augers 80. Each mixing auger 80 is driven by a hydraulic motor 71 through a coupling 72 and a shaft 74 that is supported in bearing 76. Each of the mixing augers 80 includes a substantially rectangular shaft portion 82 and mixing paddles 84.

FIG. 7a clearly illustrates the horizontal relationship of mixing augers 80. Each of the pair of mixing augers 80 is reversible, thus one pair can be driven in a forward direction, while the other pair is driven in a reverse direction. When the mixing augers 80 are operated in this fashion, the mixing paddles 82 tend to set up a swirling motion inside the batch hopper 24. The swirling action allowed by the reversible pairs of mixing augers provides a greater degree of mixing than would otherwise be possible.

Figure 8:
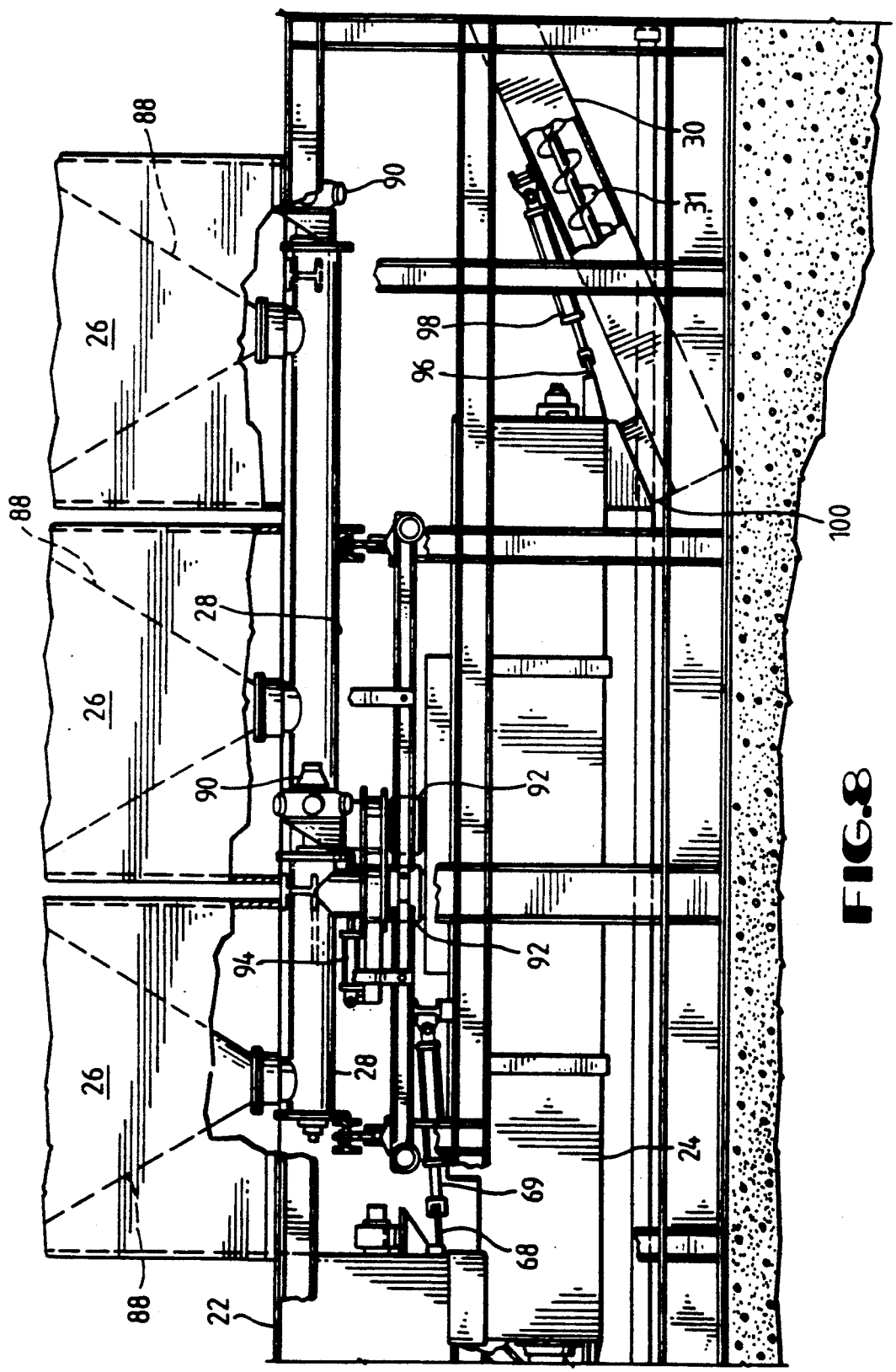
FIG. 8 is a partial side view of the additive hoppers and the batch hopper.

FIGS. 8 and 9 illustrate a means by which additives are added to waste material in the present invention. When desired to discharge waste materials from receiving hopper 22, slide gate 68 is retracted through the operation of hydraulic cylinder 69. The chopping augers 56 are then operated to discharge material through flexible boots 78 into batch hopper 24. Batch hopper 24 is suspended on a weighing mechanism that includes a load cell. The output of the load cell is transmitted to and displayed by an electronic scale mounted in the control panel 42. Prior to loading waste material into the batch hopper 24, the scale is tared to deduct the weight of the batch hopper 24. After the waste material has been loaded into the batch hopper 24, the scale therefore reflects the weight of the waste material loaded.

The type and amount of specific additive(s) necessary to adequately treat the waste material will have been determined by prior experimentation. Consequently, once the material is loaded into the batch hopper and weighed, the amount of additive necessary to treat the waste material in the hopper may be readily calculated. The appropriate amount of selected additive(s) may then be added to the batch hopper as indicated by the electronic scale. The process of measuring the amount of waste material added to batch hopper 24 and calculating, measuring and adding the appropriate amount(s) of selected additives is readily adapted to be automated through the use of a programmable electronic scale that may be used to control the addition of the additives.

Each of the additive hoppers 26 includes a tapered lower portion 88 to promote the flow of the additive(s) which are typically in the form of a fine powder. Additives from each of the additive hoppers 26 are conveyed to the batch hopper 24 by screw-type auger conveyors 28. The screw-type auger conveyors 28 are driven by hydraulic motors 90. The screw-type hydraulic conveyors 28 are connected to the top of the batch hopper 24 with a hydraulically operated damper and a flexible boot 92. Thus, once the required amount of a specific additive(s) is determined, the damper 95 for the screw conveyor connected to the particular hopper 26 containing the specific required additive is opened with hydraulic cylinder 94 and the screw-type auger conveyor 28 for the selected hopper 26 is operated by engaging hydraulic motor 90. When the electronic scale indicates that the required amount of the specific additive has been conveyed to the batch hopper 24, hydraulic motor 90 is disengaged and hydraulic cylinder 94 closes the damper 95.

Once the required amount(s) of the selected additive(s) have been added to the batch hopper 24, the waste material/additive mixture is retained and mixed in the batch hopper 24 until the desired consistency and degree of mixing have been achieved. The mixture may then be discharged from the batch hopper by retracting slide gates 96 with hydraulic cylinders 98. The mixture is then discharged through flexible boots 100 into transfer conveyor 30. Transfer conveyor 30 includes two screw-type auger conveyors 31. The screws 31 of the auger of the transfer conveyor 30 are driven by hydraulic motor 32.

FIG. 9 illustrates in detail the construction of the additive conveyors 28 of the present invention. Additive conveyor 28 is connected at its inlet end 102 to the tapered lower portion 88 of additive hopper 26. Additive conveyor 28 includes a screw-type auger 104 enclosed in a cylindrical housing 106.

The screw-type auger 104 is driven by hydraulic motor 90. Hydraulically operated damper 95 is interposed between the discharge end 108 of additive conveyor 28 and that hopper 24. In the operation of the present invention, when it is desired to transfer additive from hopper 26 to batch hopper 24, damper 95 is opened through the action of hydraulic cylinder 94. Hydraulic motor 90 is then activated to drive screw auger 104, thereby conveying additive from additive hopper 26 to batch hopper 24. As previously noted, additive conveyor 28 is isolated from batch hopper 24 with flexible boot 92. The purpose of flexible boots 78, 92 and 100 is to isolate the batch hopper from any mechanical strains that would interfere with the weighing of batch hopper 24.

Figure 10:
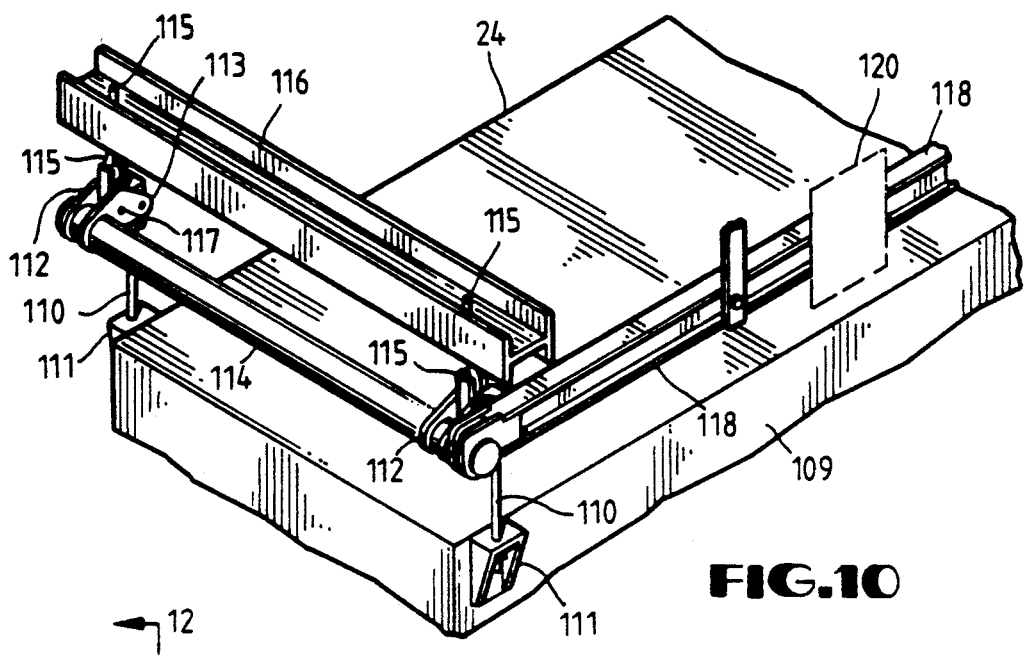
FIG. 10 is a partial perspective view of the weighing mechanism of the apparatus.

FIG. 10 illustrates the batch hopper weighing mechanism of the present invention. Each end of batch hopper 24 is suspended from rod members 110 that are fastened to brackets 111 mounted at each end of the sidewalls 109 of the batch hopper 24. Each rod member 110 is pivotably suspended from bellcrank 112 by a first pin 113. Each bellcrank is in turn pivotably suspended from structural member 116 by a second pin 117 and hook 115. Each hook 115 includes a threaded shank portion that passes through a hole in the web of structural member 116. A nut (not shown) is threaded onto the shank portion of each hook 115 to secure hook 115 to structural member 116. Tubular beams 114 pass through the side of the bellcranks 112 opposite the side where first pin 113 is located. One end of each tubular beam 114 passes through, and is connected to an arm 118 that extends parallel to and above sidewall 109.

When waste material and/or additive(s) are added to the batch hopper 24, the forces generated by the additional weight tend to rotate the bellcranks toward the batch hopper 24 and move tubular beams 114 through an arc up and away from batch hopper 22. Movement of the tubular beams 114 is however restrained by arms 118 which transmit the resultant forces to a load cell 120. Load cell 120 measures the resultant forces and generates a signal that is transmitted to an electronic scale mounted in control panel 42. A load cell suitable for use with the apparatus of the present invention is available from Interface Inc., Scottsdale, Ariz., Model No. SSM-2000. Although FIG. 10 illustrates the portion of the weighing mechanism associated with one end of the batch hopper and the load cell 120, it is understood that the other (unillustrated) end of the batch hopper is identically equipped and connected to load cell 120.

Figure 11:
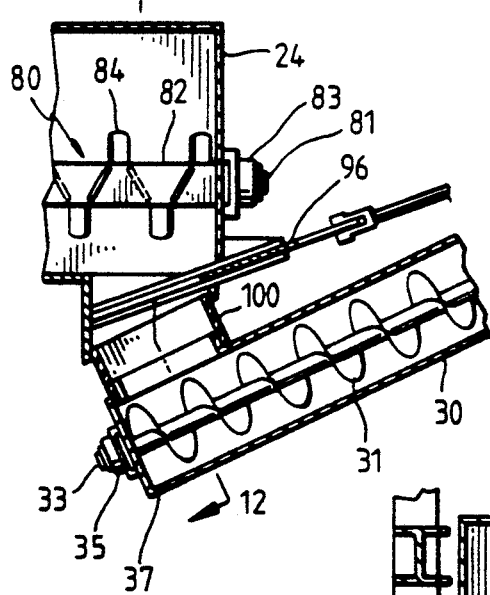
FIG. 11 is a cutaway view of the end of the batch hopper and a screw-type auger transfer conveyor.

FIG. 11 further illustrates the arrangement of batch hopper 24 and transfer conveyor 30. Mixing auger 80 terminates in shaft 81 that is mounted in bearing 83. Similarly, the screw-type augers of transfer conveyor 30 each terminate in a shaft 33 which is mounted in bearing 35 at the inlet end 37 of the transfer conveyor.

Figure 12:
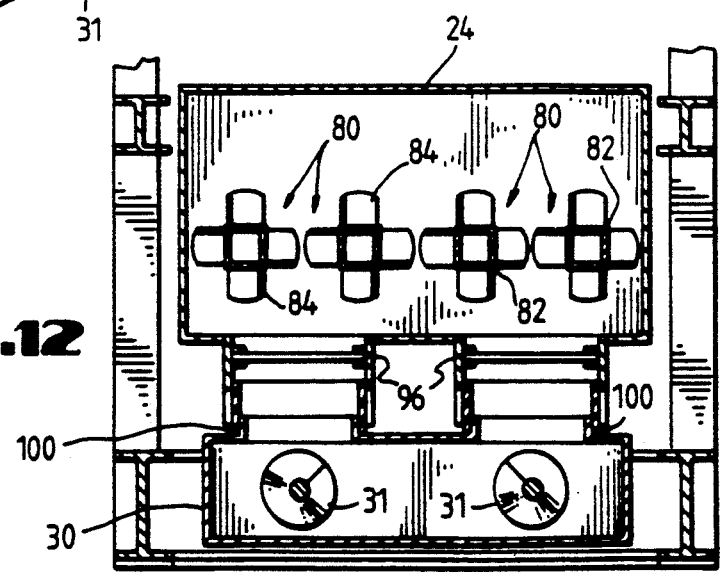
FIG. 12 is a cross-sectional view along line 12—12 of FIG. 11.

FIG. 12 further illustrates the construction of the discharge end of batch hopper 24. When it is desired to discharge the waste material/additive mixture from batch hopper 24, slide gates 96 are retracted by hydraulic cylinders 98. After the slide gates are retracted, the waste material/additive mixture is discharged through flexible boots 100 into transfer conveyor 30.

FIG. 13a illustrates a side view of the arrangement of the pin blender 36 of the present invention. Transfer conveyor 30 discharges the mixture from the batch hopper 24 through opening 29 by the action of screw conveyor 31. Screw conveyor 31 is driven by a hydraulic motor 32. The pin blender 36 includes a hopper 34 with tapered walls 132 to facilitate the flow of the mixture deposited in the hopper 34. The hopper is also equipped with a pair of screw-type auger conveyors 134 that convey the mixture discharged into the hopper 34 to the pin blender inlet 150. The pin blender inlet 150 is equipped with slide gates 148 for isolation purposes.

The pin blender 36 includes an impeller 138 mounted in a tubular housing 144 located beneath the pin blender hopper 34. The pin blender impeller consists of a central shaft 140 and spokes 142 extending from the central shaft 140. The pin blender impeller 138 is driven by a hydraulic motor 139. The end of the pin blender impeller 138 opposite the drive motor 139 is mounted in bearing 141.

The mixture deposited in the pin blender hopper 34 is conveyed to the pin blender inlet 150 by a pair of screw-type auger conveyors 134. Screw-type auger conveyors 134 are driven by hydraulic motor 135. Each of the screw-type auger conveyors 134 terminate in a shaft 133 which is mounted in a bearing 137. The pin blender 36 and pin blender hopper 34 are supported by structural members 131.

The pin blender 36 includes an impeller 138 mounted in a tubular housing 144 located beneath the pin blender hopper 34. The pin blender impeller consists of a central shaft 140 and spokes 142 extending from the central shaft 140. The pin blender impeller 138 is driven by a hydraulic motor 139. The end of the pin blender impeller 138 opposite the drive motor 139 is mounted in bearing 141.

After the mixture from the batch hopper 24 has been homogenized to the desired degree by the pin blender 36, the mixture is discharged through pin blender outlet 152 into load out conveyor 38. The pin blender outlet 152 may be equipped with a manual or hydraulically operated slide gate 153. In some cases, the mixture discharged from the pin blender 36 may be of a pumpable consistency. In such a case, it may be advantageous to substitute a concrete or slurry-type pump for load out conveyor 38.

Figure 13B:
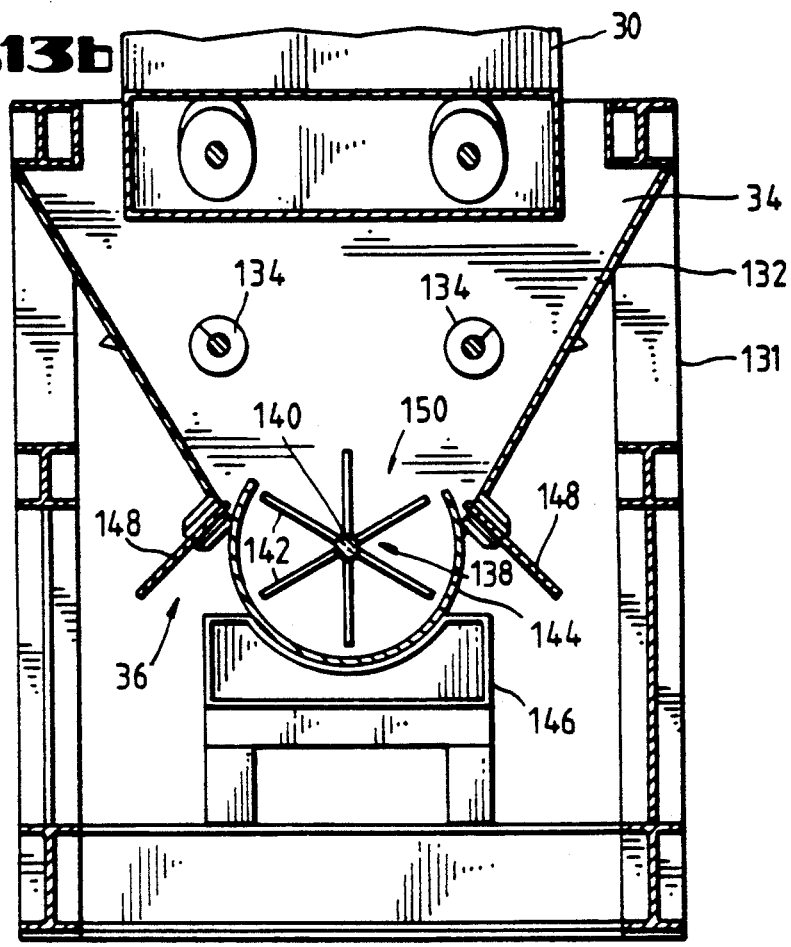

FIG. 13b is a cross-sectional view of the inlet and of the pin blender 36 of FIG. 13a taken along section lines 3b-3b. The pin blender hopper 34 is equipped with two screw-type auger conveyors 134 for transferring the mixture deposited in the hopper 34 to the pin blender inlet 150. Pin blender inlet 150 may be equipped with slide gates 148 for isolation purposes. The pin blender 36 includes an impeller 138 mounted in a cylindrical housing 144. The tubular housing 144 of the pin blender is mounted on a stand 146.

FIG. 14 further illustrates the details of pin blender impeller 138 of the present invention. The pin blender impeller 138 includes a central shaft 140 and spokes 142 that are mounted on shaft 140. The spokes 142 are preferably in a helical pattern and extend away from the shaft 140 at a 90 degree angle from the axis defined by the shaft 140.

Figure 15:
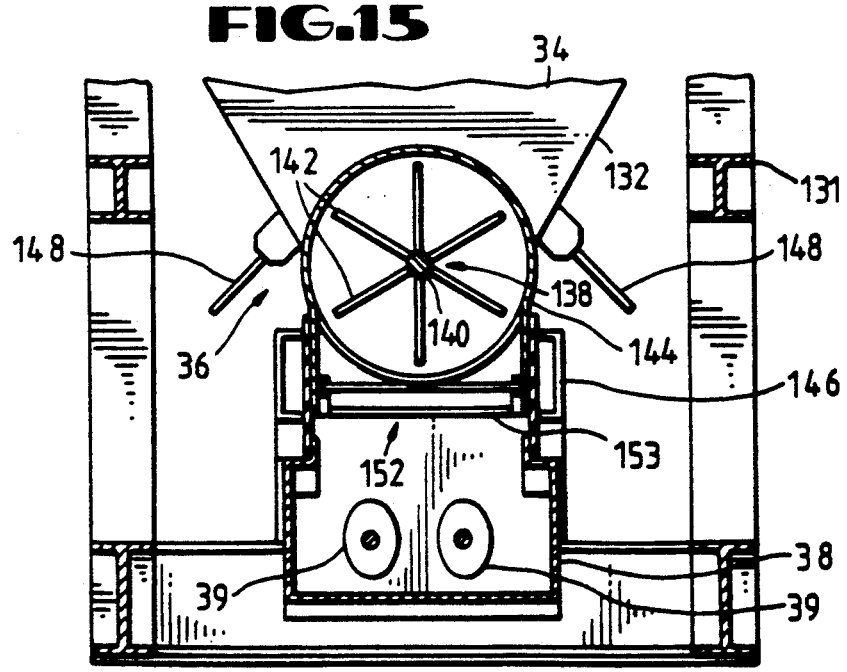

FIG. 15 is a cross-sectional view of the discharge end of the pin blender 36 of FIG. 13 taken along section lines 15—15. After the mixture from the batch hopper 24 has been homogenized to the desired degree by the beating action of the spokes 142, the mixture is discharged through outlet 152. The homogenized mixture is received by load out conveyor 38 and conveyed through the action of the screw-type auger conveyors 39 to the discharge end of the load out conveyor.

Figure 16:
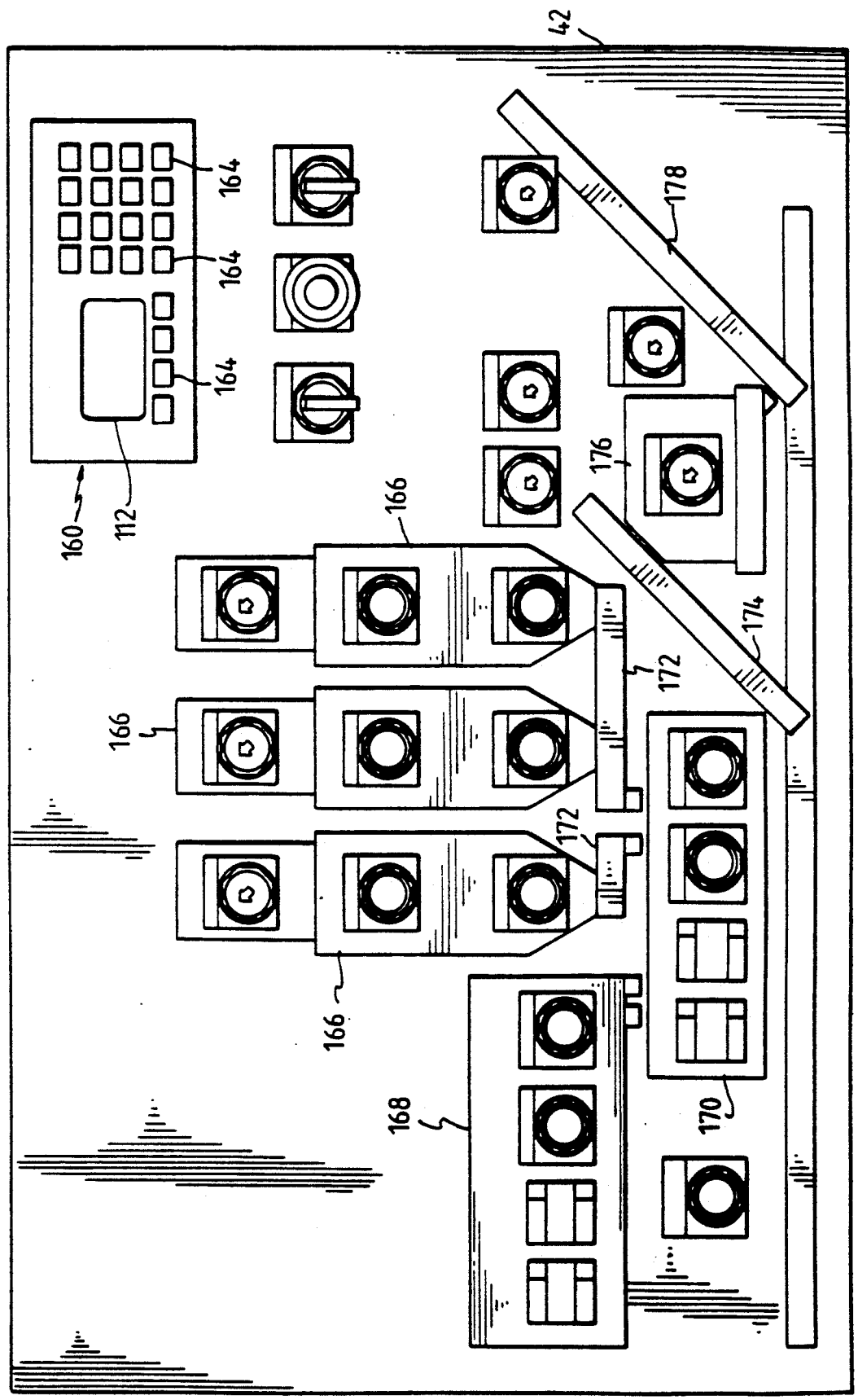
FIG. 16 is a front view of the graphical control panel of the apparatus.

FIG. 16 illustrates the control panel of the present invention. The control panel 42 includes an electronic scale 160. The electronic scale 160 incorporates a digital readout 162 and pressure sensitive buttons 164 that activate various functions. For example, buttons 164 are provided for testing the scale, zeroing the scale, taring the scale, displaying the gross net weight and clearing the scale. One electronic scale suitable for use with the present invention is manufactured by Flex-Weigh Corporation of Santa Rosa, Calif. and sold under the model number DWM IV.

Control panel 42 is graphically designed to provide a schematic representation of the apparatus of the present invention. For example, schematic representations 166 represent the additive hoppers 26. Schematic FIGS. 168 and 170 represent the receiving hopper 22 and the batch hopper 24 respectively. The additive conveyors, transfer conveyor, and load out conveyor are represented by schematic FIGS. 172, 174 and 178, respectively. Finally, the pin blender 126 is represented by schematic 176 of the control panel 42.

Figure 17:
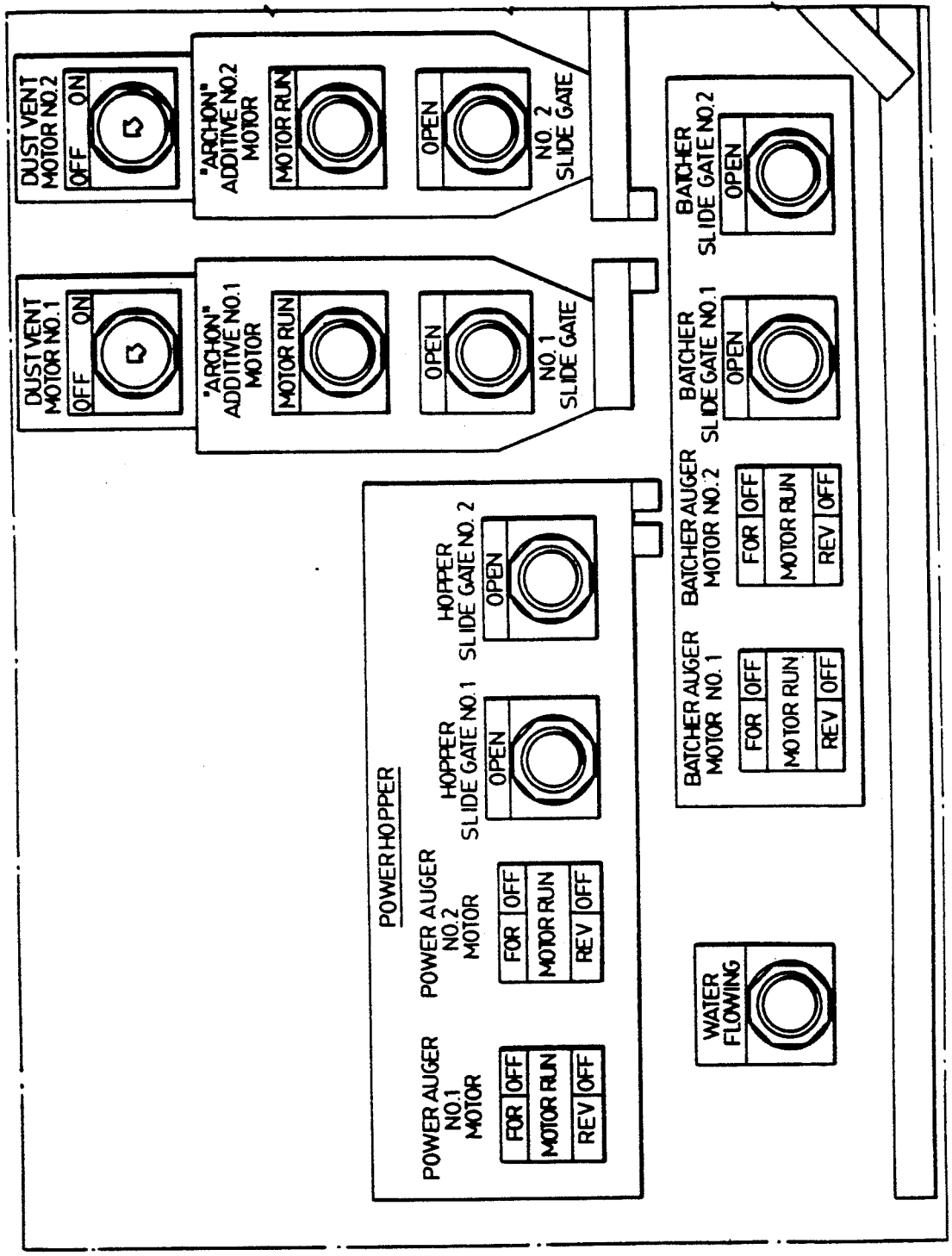
FIGS. 17 and 18 are detailed front views of the control panel including labels.
Figure 18:
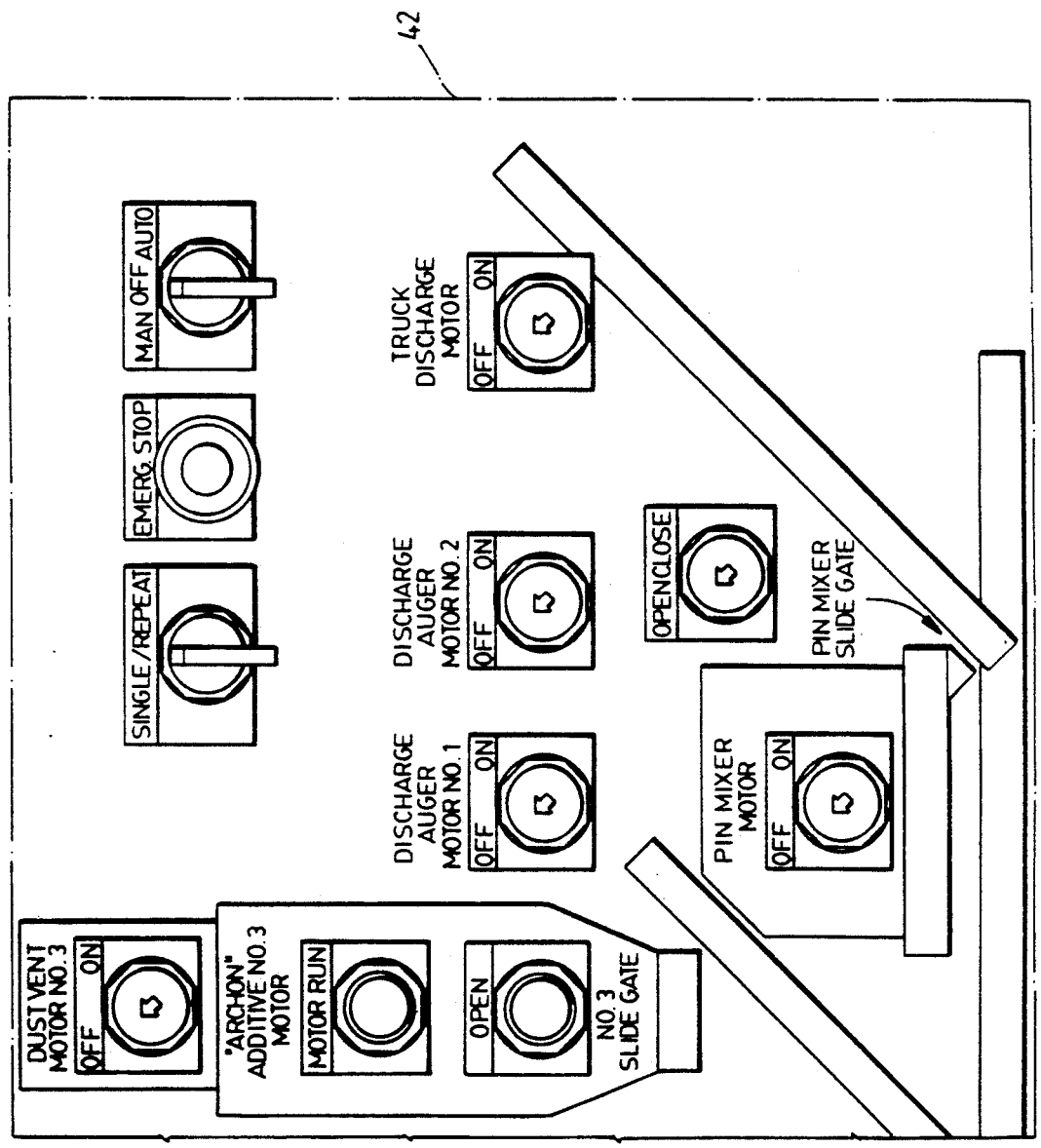

FIGS. 17 and 18 disclose the control panel 42 in greater detail to illustrate the labeling of the various controls and the functions activated and controlled thereby.

Figure 19:
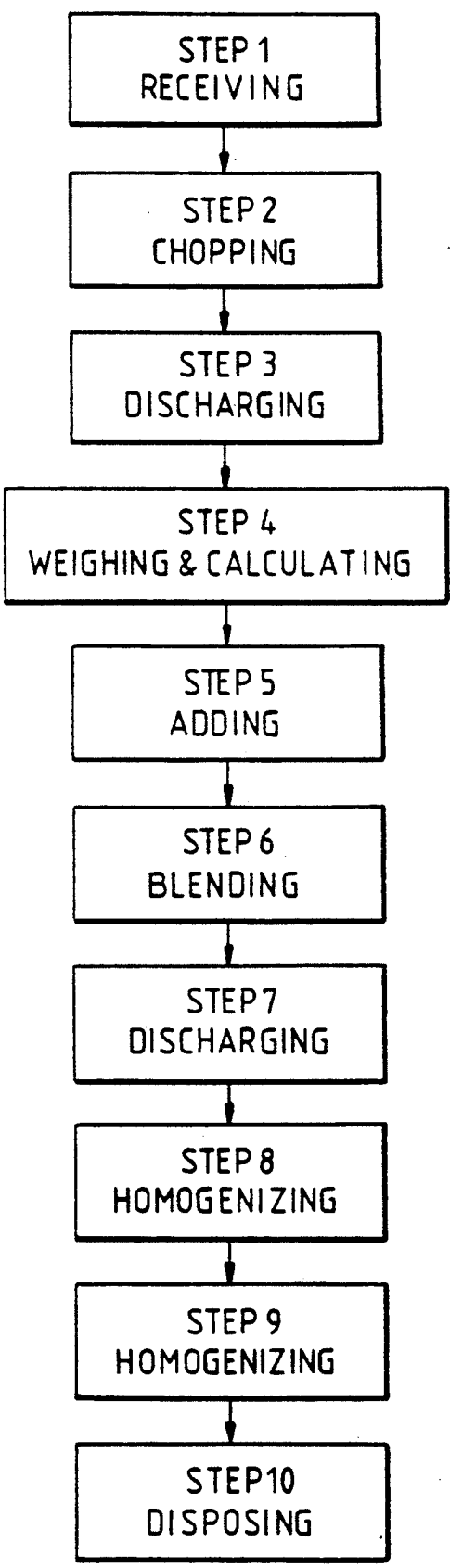
FIG 19 is a schematic illustration of the method of the present invention.

FIG. 19 is a schematic illustration of the method of the present invention. The method of the present invention comprises the steps of:

1. receiving the waste material in a receiving hopper;
2. chopping the material in the waste in the waste hopper to reduce the size of any solid or semisolid lumps
3. discharging the material from the receiving hopper into a batch hopper;
4. weighing the batch hopper to determine the amount of waste contained therein and calculating the amount of selected additive(s) required to treat the waste material;
5. adding the precalculated amount of selected additives to the batch hopper;
6. blending the additives with the waste material in the batch hopper;
7. discharging the waste material from the batch hopper into a pin blender;
8. homogenizing the waste material/additive mixture in the pin blender to achieve the desired consistency;
9. discharging the homogenized mixture from the pin blender; and
10. disposing of the mixture by hauling it or pumping it to an intermediate or final disposal site.

Although a preferred embodiment of the invention has been illustrated in the accompanying drawings and the foregoing Detailed Description, it will be understood that the invention is capable of numerous rearrangements, modifications and substitution of parts and elements without departing from the spirit and scope of the invention.

I claim:

1. Apparatus for mixing solid or semi-solid waste material with at least one selected additive comprising:
   a waste receiving hopper adapted to receive solid or semi-solid wastes containing lumps of solid material, said receiving hopper comprising a plurality of paddle-type chopping augers located within said receiving hopper for reducing the size of lumps contained in said waste material;
   a batch hopper for receiving said waste material from said receiving hopper, said batch hopper comprising a plurality of reversible paddle-type mixing augers for mixing said waste material with at least one selected additive to form a mixture;
   means for suspending said batch hopper;
   weighing means responsive to the weight of said batch hopper to determine the amount of said at least one additive to be added to said waste material;
   means for storing at least one additive;
   means for transferring a predetermined amount of said at least one additive from said storage means to said batch hopper;
   means for selectively controlling the retention of said waste material and said at least one additive in said batch hopper for a predetermined period of time to obtain the desired degree of mixing;
   means for homogenizing said mixture;
   means for discharging said mixture from said batch hopper to said means for homogenizing; and,
   means for isolating said weighing means from said receiving hopper, said transfer means and said discharge means.

2. The apparatus of claim 1 wherein said homogenizing means comprises a pin blender.

3. The apparatus of claim 1 wherein said plurality of chopping augers comprises a pair of paddle-type chopping augers.

4. The apparatus of claim 1 wherein said chopping augers and said mixing augers are rotated by hydraulic drive motors.

5. The apparatus of claim 1 wherein said plurality of mixing augers comprises two pair of paddle-type mixing augers.

6. The apparatus of claim 5 wherein each of said pairs of mixing augers is selectively reversible.

7. The apparatus of claim 1 wherein said batch hopper further comprises a plurality of additive hoppers for selectively feeding additive into said waste material.

8. The apparatus of claim 1 further comprising means for selectively adding water to said waste material for adjusting the consistency of said mixture.

9. The apparatus of claim 1 further comprising auger means for receiving said mixture and conveying said mixture for disposal.

10. The apparatus of claim 1 further comprising pump means for receiving said mixture and pumping said mixture for disposal.

11. The apparatus of claim 1 further comprising means for selectively retaining said mixture in said batch hopper for a predetermined period of time to obtain the desired degree of mixing.

12. The apparatus of claim 1 further comprising computer means for controlling said chopping augers, said mixing augers and said weighing means.

13. Apparatus for mixing solid or semi-solid waster material with at least one selected additive comprising:
    a waste receiving hopper adapted to receive solid or semi-solid wastes containing lumps of solid material, said waste receiving hopper comprising a pair of paddle-type chopping augers for reducing the size of lumps contained in said waste material;
    a batch hopper for receiving said waste material from said receiving hopper, said batch hopper comprising two pairs of reversible paddle-type mixing augers for mixing said waste material with a predetermined amount of at least one selected additive and to form a mixture;
    means for suspending said batch hopper;
    weighing means responsive to the weight of said batch hopper to determine the amount of said at least one additive to be added to said waste material;
    a plurality of additive hoppers for storing said at least one selected additive;
    transfer augers for transferring a predetermined amount of at least one selected additive from at least one of said additive hoppers to said batch hopper;
    means for selectively controlling the retention of said waste material and said at least one additive in said batch hopper for a predetermined period of time to obtain the desired degree of mixing;
    a pin blender for homogenizing said mixture;
    discharge augers for discharging said mixture from said batch hopper to said pin blender;
    means for isolating the weight of said weighing means from said receiving hopper, said transfer augers and said discharge augers.

* * * * *